US006828747B2

(12) United States Patent
Endo et al.

(10) Patent No.: US 6,828,747 B2
(45) Date of Patent: Dec. 7, 2004

(54) ELECTRIC ACTUATOR AND METHOD OF CONTROLLING THE SAME

(75) Inventors: Katsuhisa Endo, Tsukuba (JP); Takashi Fujita, Ushiku (JP); Kazuhiro Iida, Toride (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/622,738

(22) Filed: Jul. 21, 2003

(65) Prior Publication Data

US 2004/0017170 A1 Jan. 29, 2004

(30) Foreign Application Priority Data

Jul. 23, 2002 (JP) ....................................... 2002-214454

(51) Int. Cl.[7] ................................................ G05B 11/01

(52) U.S. Cl. ....................... 318/560; 318/632; 318/268; 318/271

(58) Field of Search ................................ 318/268, 271, 318/560, 632, 687, 461, 466, 135, 685, 696

(56) References Cited

U.S. PATENT DOCUMENTS 4,285,259 A * 8/1981 Jelinek et al. ................ 83/552
5,003,524 A * 3/1991 Ikeda ...................... 369/44.28
5,117,164 A * 5/1992 Ishii et al. .................. 318/135
5,610,686 A * 3/1997 Osanai ........................ 355/72
5,939,852 A * 8/1999 Akutsu et al. .............. 318/640
6,028,376 A * 2/2000 Osanai et al. ................ 310/12
6,094,255 A * 7/2000 Ota ............................ 355/75

* cited by examiner

*Primary Examiner*—Rina Duda
(74) *Attorney, Agent, or Firm*—Paul A. Guss

(57) ABSTRACT

The stop positions of start and end points for a slider are set by positionally adjusting a stopper and/or a stopper. The distance that the slider has traveled is learned according to a command from a control console in response to a manipulation of a learning manipulation element, and at least one of a speed and an acceleration is set by a speed regulator and an acceleration regulator. The control console outputs a drive signal to a motor based on at least one of the set speed in constant-speed movement of the slider and the set acceleration of accelerated movement of the slider and the learned distance that the slider has traveled, thereby moving the slider. For moving the slider to the start point or the end point, the control console controls the slider to move at a speed lower than the speed in constant-speed movement, and positions the slider at the start point or the end point.

11 Claims, 16 Drawing Sheets

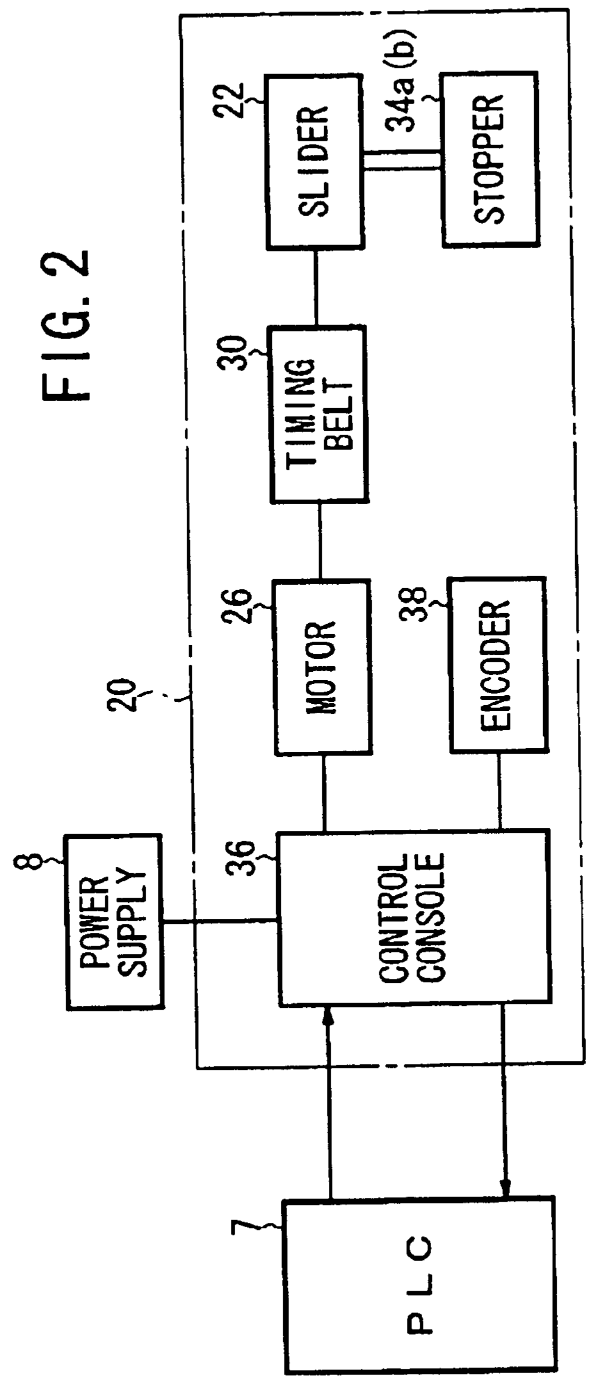
F I G. 2
22
SLIDER
34a (b)
STOPPER
30
TIMING BELT
26
MOTOR
38
ENCODER
20
8
POWER SUPPLY
36
CONTROL CONSOLE
7
P L C 20
26
MOTOR
38
ENCODER
36
66
DRIVE CIRCUIT
68
MANIPULATION UNIT
60
MICROCOMPUTER
72
MEMORY UNIT
8
POWER SUPPLY
64
CONVERTER
74
COMMUNICATION UNIT
70
INDICATOR UNIT
62
INPUT/OUTPUT UNIT
7
PLC 20
22
SLIDER
34a (b)
STOPPER
30
TIMING BELT
26
MOTOR
38
ENCODER
8
POWER SUPPLY
36
CONTROL CONSOLE
98
EXTERNAL MANIPULATION UNIT
7
PLC

ELECTRIC ACTUATOR AND METHOD OF CONTROLLING THE SAME

BACKGROUND OF THE INVENTION

1. Field of the Invention

The present invention relates to an electric actuator for transmitting drive power from an electric drive source through a drive power transmitting mechanism to a moving mechanism thereby to move the moving mechanism, and a method of controlling such an electric actuator.

2. Description of the Related Art

Heretofore, electric actuators have widely been used as a mechanism for transferring workpieces or the like.

As shown in FIG. 15 of the accompanying drawings, a conventional electric actuator 1 has a motor 2 as an electric drive source which is energized to cause a drive power transmitting mechanism 3 (e.g., a ball screw, a timing belt, or the like) to displace a slider 4 including a feed table or the like along a guide (e.g., a linear guide rail, a guide block, etc.) for thereby delivering a workpiece or the like placed on the slider 4 to a desired position.

In order to displace the slider 4, i.e., to control movement of the slider 4, a controller 5 outputs a drive signal to the motor 2 based on positional information of the slider 4 which is acquired by an encoder 6 and a command signal issued from a PLC (Programmable Logic Controller) 7 which controls an apparatus on which the electric actuator 1 is mounted. In FIG. 15, a power supply 8 supplies electric energy to the controller 5 and the motor 2.

When conditions for moving the slider 4 are to be set, i.e., when conditions including a stop position, a speed, and an acceleration are to be set, the user of the electric actuator 1 needs to enter numerical data of those conditions from an external input mechanism 9 such as a teaching box, a PC (Personal Computer), or the like into the controller 5. Specifically, as shown in FIG. 16 of the accompanying drawings, numerical data of a stop position is entered in step S101, and then numerical data of a speed and an acceleration are entered in step S102.

Thereafter, the PLC 7 and the controller 5 move the slider 4 in a test mode in step S103. Then, it is determined whether the movement of the slider 4 in the test mode is appropriate or not in step S104. Specifically, the user confirms the movement of the slider 4 in the test mode and determines whether the movement of the slider 4 in the test mode is appropriate or not. If the movement of the slider 4 in the test mode is judged as being appropriate (YES in step S104), then the slider is ready to be operated at an operation mode in step S105.

If the movement of the slider 4 in the test mode is judged as being inappropriate (NO in step S104), the process returns to step S102, and steps S102 and S103 are repeated. The setting of a stop position, a speed and an acceleration is repeated until the movement of the slider 4 in the test mode is judged as being appropriate (YES in step S104).

For setting a stop position of the slider 4 from the external input mechanism 9, the user usually measures the distance between stop positions of the slider 4 in advance, or calculates the distance between stop positions for the slider 4 based on positional information (the number of output pulses) from the encoder 6, and enters the measured or calculated distance as numerical data. For setting a speed or an acceleration of the slider 4 from the external input mechanism 9, the user enters desired numerical data of a speed or an acceleration, confirms the movement of the slider 4 in a test mode based on the entered numerical data, and if the movement of the slider 4 is not appropriate, changes the numerical data and reenters the changed numerical data. As described above, the process to set conditions for moving the slider 4 is highly complex because numerical data need to be manually entered and the movement of the slider 4 needs to be confirmed several times in a test mode.

The electric actuator 1 controls the slider 4 to stop at a stop position that has been set, based on positional information from the encoder 6. The accuracy with which to stop the slider 4 at the stop position is governed by the resolution of the encoder 6, i.e., the number of pulses output from the encoder 6 per unit distance. Therefore, if positional control with higher accuracy is required, it is necessary to employ a different encoder of higher resolution as the encoder 6, and also to employ a ball screw or the like with higher accuracy as the drive power transmitting mechanism 3. As a result, the cost of electric actuator 1 increases.

SUMMARY OF THE INVENTION

It is therefore a general object of the present invention to provide an electric actuator which allows moving conditions to be set easily and which has an inexpensive structure for positioning a moving mechanism at a stop position with increased positioning accuracy.

An electric actuator according to the present invention sets a stop position as a moving condition for a moving mechanism by positionally adjusting a positioning mechanism, and allows the user of the electric actuator to set at least one of a speed and an acceleration of the moving mechanism by operating a speed regulator or an acceleration regulator while confirming movement of the moving mechanism. Therefore, the user is not required to perform a complex process of entering numerical data of moving conditions, and can easily and reliably set moving conditions for the moving mechanism.

The electric actuator learns the distance that the moving mechanism has traveled, and moves the moving mechanism based on the learned distance and at least one of the speed during constant-speed movement of the moving mechanism and the acceleration during accelerated movement of the moving mechanism. For moving the moving mechanism to the start point or the end point, the moving mechanism is controlled to move at a speed lower than the speed in constant-speed movement and positioned at the start point or the end point. As a result, the moving mechanism can accurately be positioned.

Since the positioning accuracy of the moving mechanism is determined by abutment of the moving mechanism against the positioning mechanism, the moving mechanism can be positioned accurately by a positional information detector and a drive power transmitting mechanism which are relatively inexpensive without the need for a positional information detector and a drive power transmitting mechanism which are of high resolution and are highly expensive.

The positioning mechanism includes a shock absorber for damping shocks produced when the moving mechanism abuts against the positioning mechanism. Therefore, shocks produced when the moving mechanism abuts against the positioning mechanism can be reduced.

A method of controlling an electric actuator according to the present invention sets a stop position as a moving condition for a moving mechanism by positionally adjusting a positioning mechanism, and allows the user of the electric actuator to set at least one of a speed and an acceleration for the moving mechanism by operating a speed regulator or an acceleration regulator while confirming movement of the moving mechanism. Therefore, the user is not required to perform a complex process of entering numerical data of moving conditions, and can easily and reliably set moving conditions for the moving mechanism.

In the above method, the distance that the moving mechanism has traveled is learned, and the moving mechanism is moved based on the learned distance and at least one of the speed in constant-speed movement of the moving mechanism and the acceleration in accelerated movement of the moving mechanism. For moving the moving mechanism to the start point or the end point, the moving mechanism is controlled to move at a speed lower than the speed in constant-speed movement and positioned at the start point or the end point. As a result, the moving mechanism can accurately be positioned.

In the above method, the moving mechanism is stopped at an intermediate point between the start point and the end point according to a command from a control console based on the positional information from the positional information detector. The moving mechanism can be stopped not only at the start point and the end point, but also at the intermediate point between the start point and the end point. Thus, the moving mechanism can move or transfer a workpiece or the like with increased freedom.

In the above method, the control console monitors the distance that the moving mechanism travels which is calculated based on the positional information from the positional information detector and the speed of the moving mechanism, and limits a drive signal output to an electric drive source after the moving mechanism reaches the start point or the end point if the monitored distance that the moving mechanism travels is judged as reaching the distance learned by a learning device or if the monitored distance that the moving mechanism travels is judged as not reaching the distance learned by the learning device and the speed of the moving mechanism is equal to or lower than a predetermined speed. Thereafter, after the moving mechanism has reached the start point or the end point, the electric drive source is prevented from generating an excessive torque. As a result, the electric drive source, a power transmitting mechanism, and the start and end points are prevented from being subjected to an excessive load. The electric actuator thus has its durability increased.

In the above method, the electric drive source comprises a motor, and the control console monitors the distance that the moving mechanism travels which is calculated based on the positional information from the positional information detector, and resets a deviation between the drive signal and the monitored distance that the moving mechanism travels if the deviation exceeds a predetermined range after the moving mechanism reaches the start point or the end point. The positioning accuracy at the stop position of the moving mechanism is increased, and the electric drive source, the power transmitting mechanism, and the start and end points are prevented from being subjected to an excessive load. The electric actuator thus has its durability further increased.

In the above method, the electric drive source comprises a motor, and the control console rotates the motor alternately in a normal direction and a reverse direction under open-loop control to synchronize the positional information from the positional information detector and positional information corresponding to a rotational angle of the motor with each other when a power supply of the electric actuator is turned on. Consequently, the position to which the moving mechanism is moved can accurately be detected according to the positional information based on the rotational angle of the motor, maximizing the capability of the motor.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is block diagram of a control system including the electric actuator shown in FIG. 1, a power supply, and a PLC;

DESCRIPTION OF THE PREFERRED EMBODIMENTS

Figure 1:
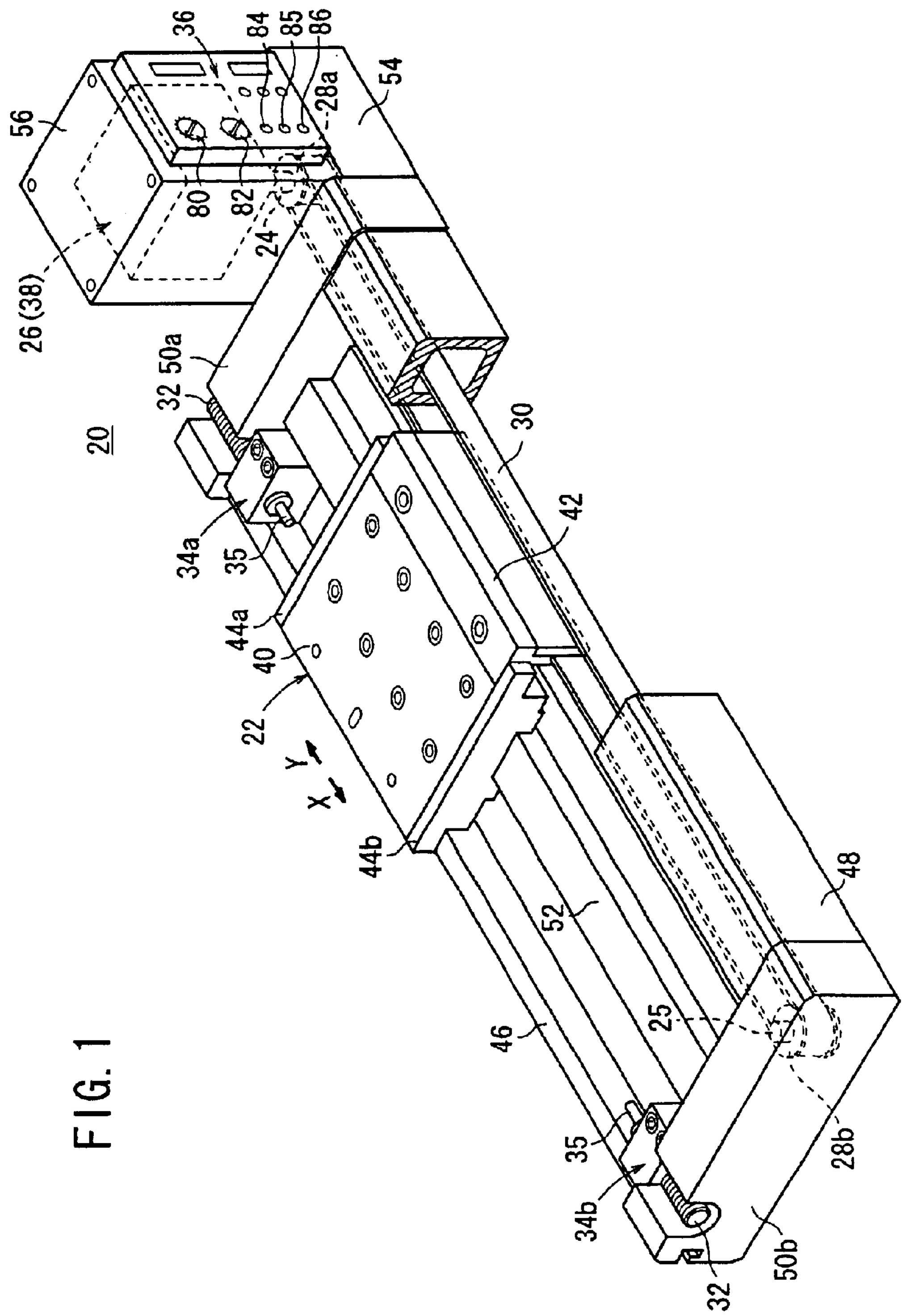
FIG. 1 is a perspective view of an electric actuator according to a first embodiment of the present invention.

FIGS. 1 and 2 show an electric actuator 20 according to a first embodiment of the present invention.

As shown in FIGS. 1 and 2, the electric actuator 20 comprises a slider 22 as a moving mechanism for moving or feeding a workpiece or the like, a motor 26 as an electric drive source including a drive shaft 24, a timing belt 30 as a drive power transmitting mechanism for transmitting drive power from the motor 26 to the slider 22 through a gear **28*a* fitted over the drive shaft 24, stoppers 34*a*, 34*b* including stop bolts 32 for adjusting relative stop positions such as a start point and an end point for the slider 22, and a control console 36 for controlling the electric actuator 20 including the slider 22**.

The motor 26 comprises, for example, a stepping motor including an encoder 38 as a positional information detector for detecting positional information of the slider 22. Alternatively, the motor 26 may comprise a brushless DC (Direct Current) motor having a servo mechanism, a brush DC motor, an AC (Alternating Current) motor, or a linear motor.

Each of the stoppers 34*a*, 34*b* preferably includes a shock absorber 35 for damping shocks applied to the slider 22. The shock absorber 35 comprises, for example, a resilient member such as a spring, or an air cushion for use in a fluid pressure device such as an air cylinder or the like.

In the illustrated embodiment, each of the stoppers 34*a*, 34*b* include the stop bolt 32 for adjusting a stop position of the slider 22. However, one of the stoppers 34*a*, 34*b* may have a fixed stop which requires no adjustment. In the present embodiment, for example, the stopper 34*a* at the start point may be fixed and/or adjustable, and the stopper 36*b* at the end point may be fixed and/or adjustable as well.

The slider 22 has a table 40 for placing a workpiece or the like thereon, a belt holder 42 gripping the timing belt 30, and end plates 44*a*, 44*b* attached respectively to end faces of the table 40 for abutting against the stoppers 34*a*, 34*b*, respectively, to prevent the end faces of the table 40 from being worn. The slider 22 is slidably supported on a guide rail 52. The guide rail 52 is mounted in a structural assembly comprising a main frame 46 and an auxiliary frame 48, which are disposed along the directions (indicated by the arrows X, Y in FIG. 1) of movement of the slider 22, and end blocks 50*a*, 50*b* fixed to the respective opposite ends of the main frame 46 and the auxiliary frame 48.

The motor 26 is mounted on a bracket 54 fixedly mounted on the end block 50*a* and extending outwardly from the end block 50*a*. The motor 26 is encased by a casing 56. The casing 56 is removably attached to the bracket 54 by bolts or the like (not shown).

The control console 36 is removably attached to the casing 56 by bolts or the like (not shown). Alternatively, the control console 36 may be removably attached to the bracket 54.

The timing belt 30, which is in the form of an elongate endless shape, has a semicircular end meshing with the gear 28*a* which is fitted over the drive shaft 24 of the motor 26 and an opposite semicircular end meshing with a gear 28*b* which is rotatably supported in the end block 50*b* by a shaft 25. The timing belt 30 has a stretch between its semicircular ends which is gripped by the belt holder 42 of the slider 22.

In FIG. 2, a PLC 7 controls an apparatus on which the electric actuator 20 is mounted. A power supply 8 supplies electric energy to the control console 36 and the motor 26.

Figure 3:
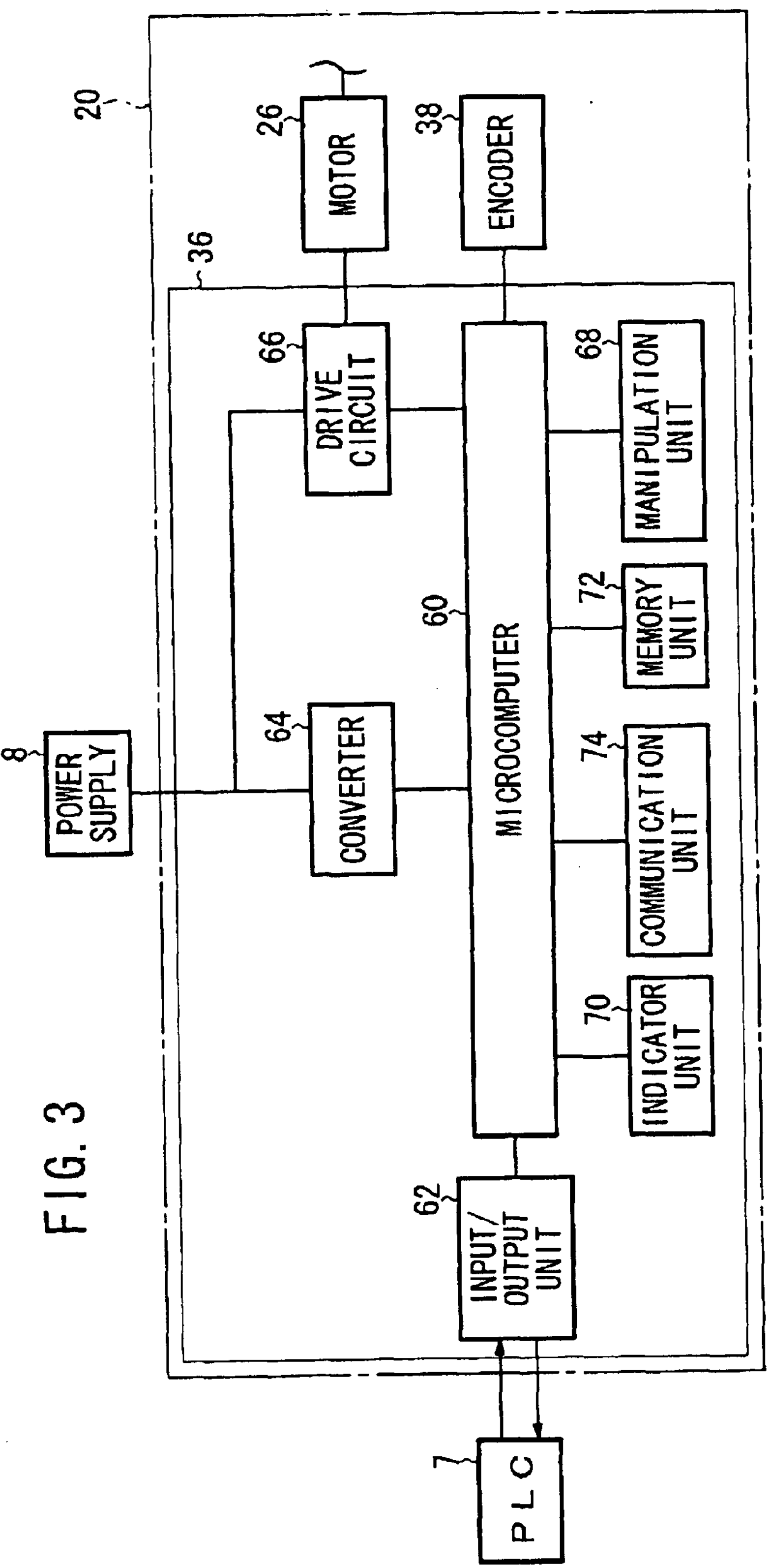
FIG. 3 is a block diagram showing in detail a control console of the electric actuator.

The electric actuator 20 according to the first embodiment has mechanical details basically constructed as described above. A system configuration of the control console 36 will be described below with reference to FIGS. 3 and 4.

The control console 36 has functions including control, comparison, decision, calculation, and timing functions to be performed in the electric actuator 20. The control console 36 comprises a microcomputer 60 for performing the above functions, an input/output unit 62 connected to the PLC 7 through a photocoupler or the like for exchanging signals between the microcomputer 60 and the PLC 7, a converter 64 for converting a DC voltage of 24 [V] which is the same as the operating voltage for the PLC 7 into a DC voltage of 5 [V] as an operating voltage for the microcomputer 60 and other components, and a drive circuit 66 for amplifying drive signals output from the microcomputer 60 to energize the motor 26.

The control console 36 also has a manipulation unit 68 for entering conditions or the like that are set by the user of the electric actuator 20, an indicator unit 70 such as LEDs (Light Emitting Diodes), lamps, etc. for displaying set conditions and operating states of the electric actuator 20, a memory unit 72 such as an EEPROM (Electrically Erasable Programmable Read Only Memory) or the like for storing set conditions entered from the manipulation unit 68 and reading them to the microcomputer 60 when necessary, and a communication unit 74 serving as an interface with an external input mechanism such as a teaching box, a PC (Personal Computer), or the like. The microcomputer 60 and the memory unit 72 jointly make up a learning device.

Figure 4:
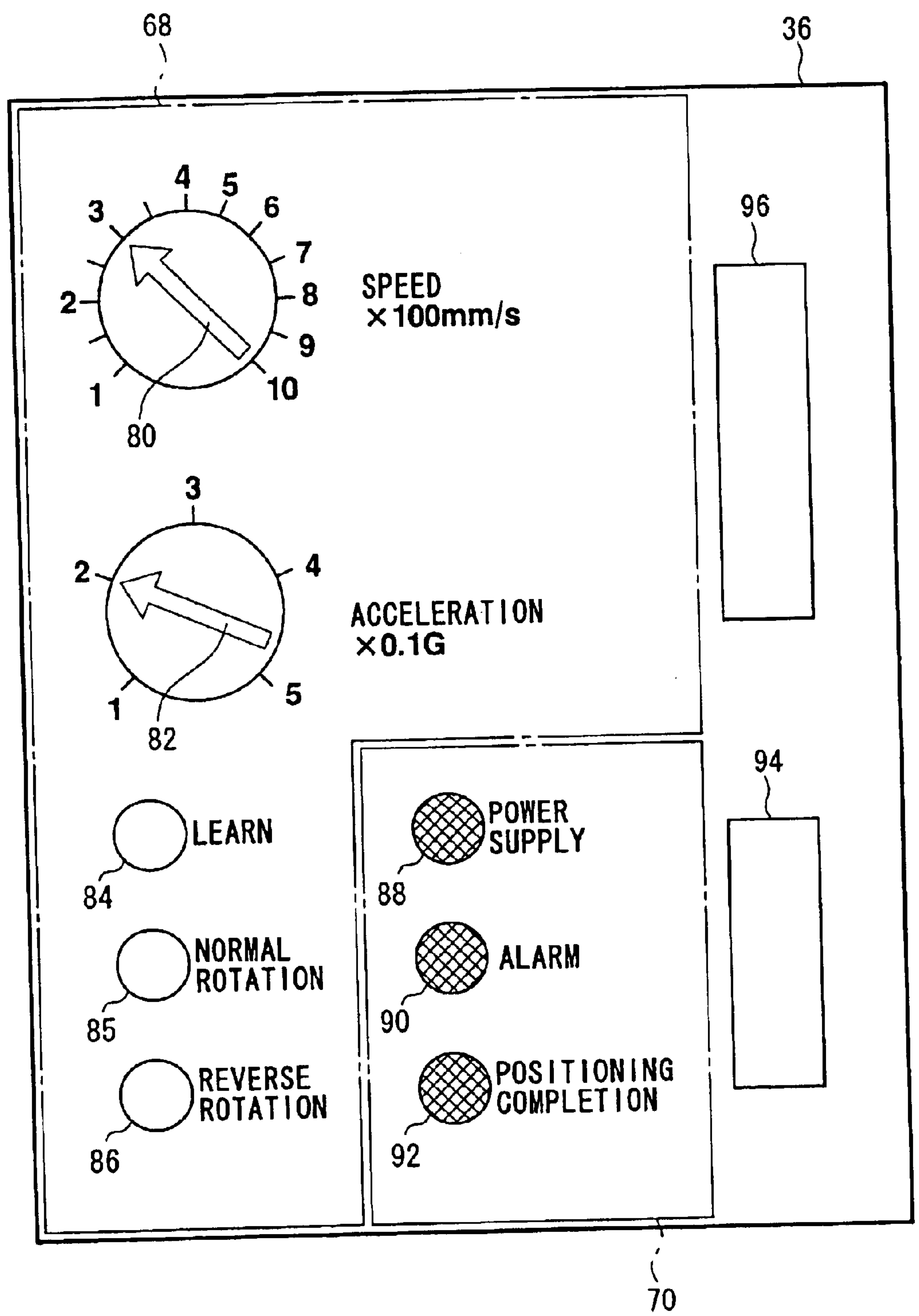
FIG. 4 is a front elevational view of the control console shown in FIG. 3.

As shown in FIG. 4, the manipulation unit 68 has a speed regulator 80, which comprises, e.g., a general rheostat or a rheostat that is adjustable stepwise, or the like, for setting a speed as a moving condition of the slider 22, an accelerator regulator 82, which comprises, e.g., a general rheostat or a rheostat that is adjustable stepwise, or the like, for setting an acceleration as a moving condition of the slider 22, a learning manipulation element 84, which comprises a push-button or the like, for moving the slider 22 at a certain speed to learn a distance that the slider 22 is to move between the stoppers 34*a*, 34*b*, and a normal rotation manipulation element 85 and a reverse rotation manipulation element 86 for moving the slider 22 as desired by energizing the motor 26 under manual control. When the normal rotation manipulation element 85 is pressed, the slider 22 moves in the direction indicated by the arrow X shown in FIG. 1, for example. When the reverse rotation manipulation element 86 is pressed, the slider 22 moves in the direction indicated by the arrow Y shown in FIG. 1, for example.

In the first embodiment, the speed regulator 80 is capable of adjusting the speed of the slider 22 in a range from 100 to 1000 [mm/sec.] and has corresponding graduations, and the acceleration regulator 82 is capable of adjusting the acceleration of the slider 22 in a range from 0.1 to 0.5 [G] and has corresponding graduations. The speed regulator 80 and the acceleration regulator 82 can have their adjustable ranges freely selected. The manipulation elements 84, 85, 86 have LEDs which are turned on when the manipulation elements 84, 85, 86 are operated, thus indicating that the manipulation elements 84, 85, 86 are operated.

In the first embodiment, the manipulation unit 68 is illustrated as having the speed regulator 80 and the acceleration regulator 82. However, the manipulation unit 68 may have only the speed regulator 80 or the acceleration regulator 82. If the manipulation unit 68 only has the acceleration regulator 82, then the speed condition of the slider 22 is preset as a constant value by the microcomputer 60. Specifically, the speed condition is set to the allowable maximum speed of the electric actuator 20, and is applied when the slider 22 is moved for a short period of time by adjusting only the acceleration regulator 82.

The indicator unit 70 has a power supply indicator 88 for indicating when the control console 36 is turned on, an alarm indicator 90 for indicating when a malfunction has occurred, e.g., when the slider 22 has stopped at a position other than a predetermined stop position, and a positioning completion indicator 92 for indicating when the slider 22 is normally moved and positioned at a predetermined stop position.

These indicators 88, 90, 92 comprise LEDs, lamps, or the like which are energized to give their indications.

The control console 36 also has a connector 94 for connecting from an external circuit to the communication unit 74, and a connector 96 for connection to an external manipulation unit 98 (see FIG. 7) which has alternate components and functions for the components and functions of the control console 36.

Operation and advantages of the electric actuator 20 thus arranged will be described below in relation to a method of controlling the electric actuator 20.

Figure 5:
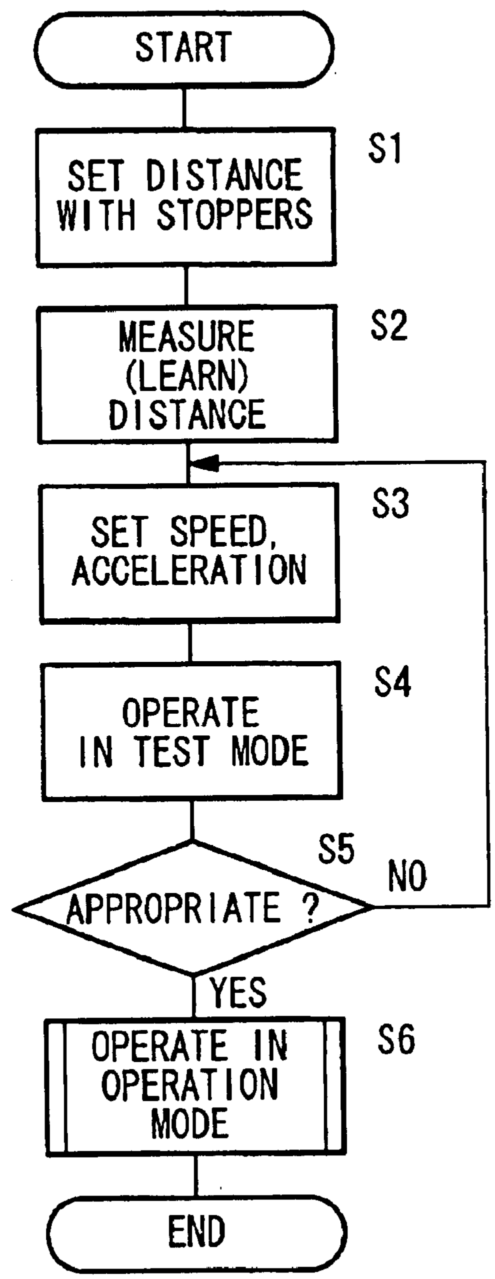
FIG. 5 is a flowchart of a process of setting moving conditions for the electric actuator and changing from a test mode to an operation mode.

First, setting various moving conditions for the electric actuator 20 and transferring from a test mode to an operation mode will be described below with reference to FIG. 5.

In Step S1, a distance that the slider 22 is to move is set by the stoppers 34*a*, 34*b*. Specifically, the user of the electric actuator 20 tightens or loosens the stop bolts 32 of the stoppers 34*a*, 34*b*, thus adjusting and setting stop positions for the slider 22.

In step S2, the user presses the learning manipulation element 84 to move the slider 22 in a learning mode, i.e., to move the slider 22 at a given constant speed in one or several reciprocating strokes. Specifically, when the learning manipulation element 84 is pressed, the microcomputer 60 issues a drive signal through the drive circuit 66 to the motor 26, moving the slider 22 at a given constant speed. While the slider 22 is moving between the stoppers 34*a*, 34*b*, the microcomputer 60 calculates the distance that the slider 22 travels between the stop positions at the stoppers 34*a*, 34*b* based on positional information output from the encoder 38, i.e., the number of output pulses from the encoder 38. The calculated distance is stored in the memory unit 72.

In step S3, the user operates the speed regulator 80 or the acceleration regulator 82 to adjust at least one of the speed and the acceleration to a desired value, which is stored in the memory unit 72 of the control console 36.

In step S4, the slider 22 is operated in a test mode based on a command issued from the PLC 7 which controls the apparatus on which the electric actuator 20 is mounted, e.g., based on an operation command issued when the user operates a manual manipulation button on a control console, not shown, of the apparatus. Alternatively, the slider 22 may be operated in a test mode by manually operating the normal rotation manipulation element 85 or the reverse rotation manipulation element 86 of the manipulation unit 68.

In step S5, the user determines whether the movement of the slider 22 in the test mode is appropriate or not in view of a desired movement. If the movement of the slider 22 in the test mode is appropriate (YES in step S5), then the test mode changes to an operation mode for the electric actuator 20 in step S6. If the movement of the slider 22 in the test mode is not appropriate (NO in step S5), then the process returns to step S3, and steps S3 to S5 are repeated.

Specifically, in step S3, the user operates the speed regulator 80 or the acceleration regulator 82 to readjust at least one of the speed and the acceleration, which is stored in the memory unit 72 of the control console 36. Then, in step S4, the slider 22 is operated in a test mode. In step S5, it is determined whether the movement of the slider 22 in the test mode is appropriate or not. If the answer to step S5 is YES, then the test mode changes to an operation mode for the electric actuator 20 in step S6.

As described above, the user operates the speed regulator 80 or the acceleration regulator 82 to adjust at least one of the speed and the acceleration to a desired value, and the user confirms the movement of the slider 22 in the test mode and sets or changes at least one of the speed in the constant-speed movement of the slider 22 and the acceleration in the accelerated movement of the slider 22. In this manner, the user is not required to perform a complex process of measuring a distance that the slider 22 is to travel in advance and entering numerical data of the distance. Instead, the user can confirm the movement of the slider and easily set or change moving conditions therefor.

In step S6, the electric actuator 20 is operated in an operation mode including a protective control process (e.g., an excessive torque prevention control process) for the motor 26 controlled by the control console 36, the timing belt 30, or the slider 22, basically based on control program commands from the PLC 7 in relation to the apparatus on which the electric actuator 20 is mounted.

Figure 6:
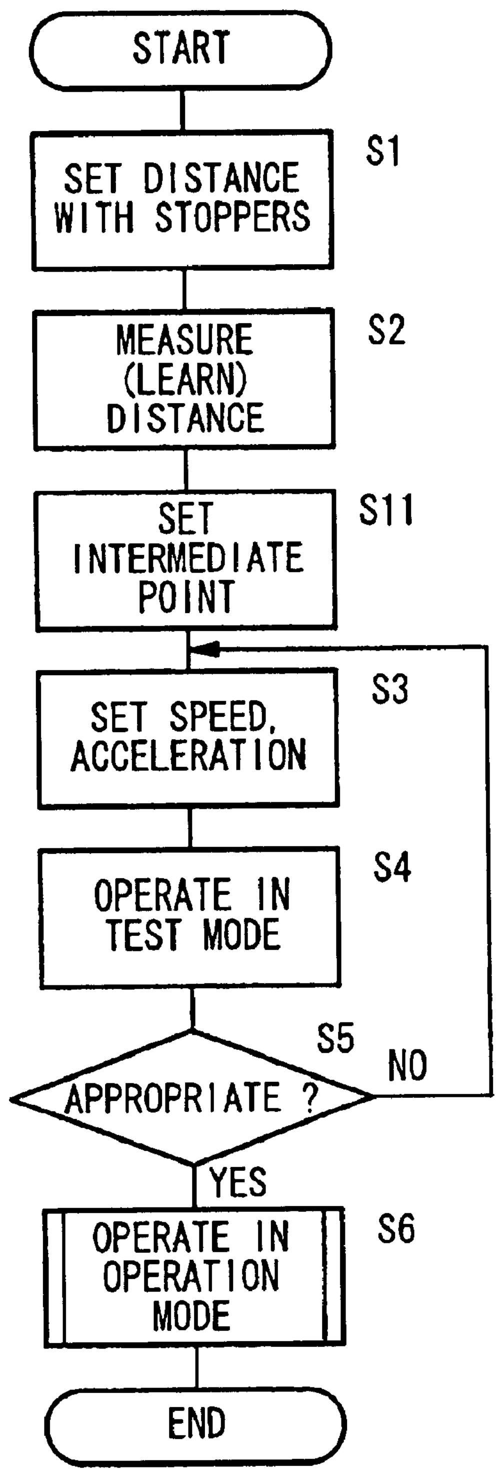
FIG. 6 is a flowchart of a process of setting a slider of the electric actuator to stop at an intermediate point.

A process of setting the slider 22 of the electric actuator 20 to stop at, at least, one point (hereinafter referred to as an intermediate point) between the stoppers 34*a*, 34*b* will be described below with reference to FIG. 6. Those steps shown in FIG. 6 which are identical to steps of the process shown in FIG. 5 are denoted by identical reference characters, and will not be described in detail below.

In step S11, the motor 26 is released from a stopped or locked state, and the user manually moves the slider 22 from a position held against the stopper 34*a*, for example, to a desired position and stops the slider 22 in that position. While the slider 22 is moved and stopped as above, the microcomputer 60 calculates the distance that the slider 22 is moved, i.e., an intermediate point where the slider 22 is stopped, based on positional information from the encoder 38. The calculated distance is stored in the memory unit 72. In this manner, a setting is made to stop the slider 22 at a desired intermediate point between the stoppers 34*a*, 34*b*.

An arrangement for setting moving conditions for the slider 22 from an external manipulation unit 98 will be described below with reference to FIG. 7.

Figure 7:
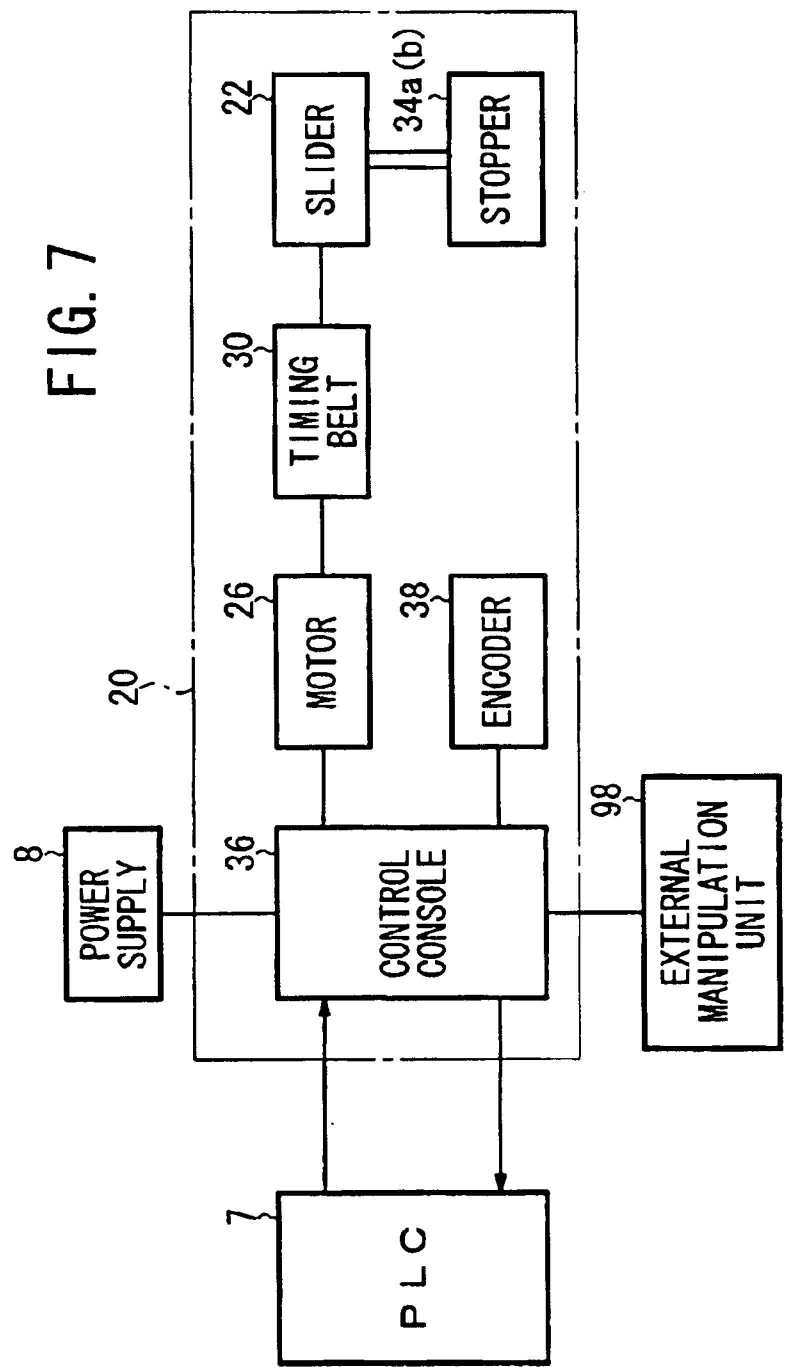
FIG. 7 is a block diagram of a control system for setting moving conditions for the electric actuator from an external manipulation unit.

As shown in FIG. 7, an external manipulation unit 98 is connected to the control console 36 by the connector 96 (see FIG. 4) mounted on the control console 36. The external manipulation unit 98 has alternate components and functions for the components and functions of the control console 36, and serves to set various moving conditions including a stop position, a speed in the constant-speed movement, and an acceleration in the accelerated movement for the slider 22. Therefore, if the external manipulation unit 98 is connected to the control console 36, then the manipulation unit 68 may be dispensed with. The external manipulation unit 98 allows the user to remotely set moving conditions for the slider 22.

An operation mode of the electric actuator 20 in step S6 (see FIG. 5) will be described in detail below. It is assumed that the slider 22 moves from a stop position at the stopper 34*a* to another stop position at the stopper 34*b*.

Figure 8:
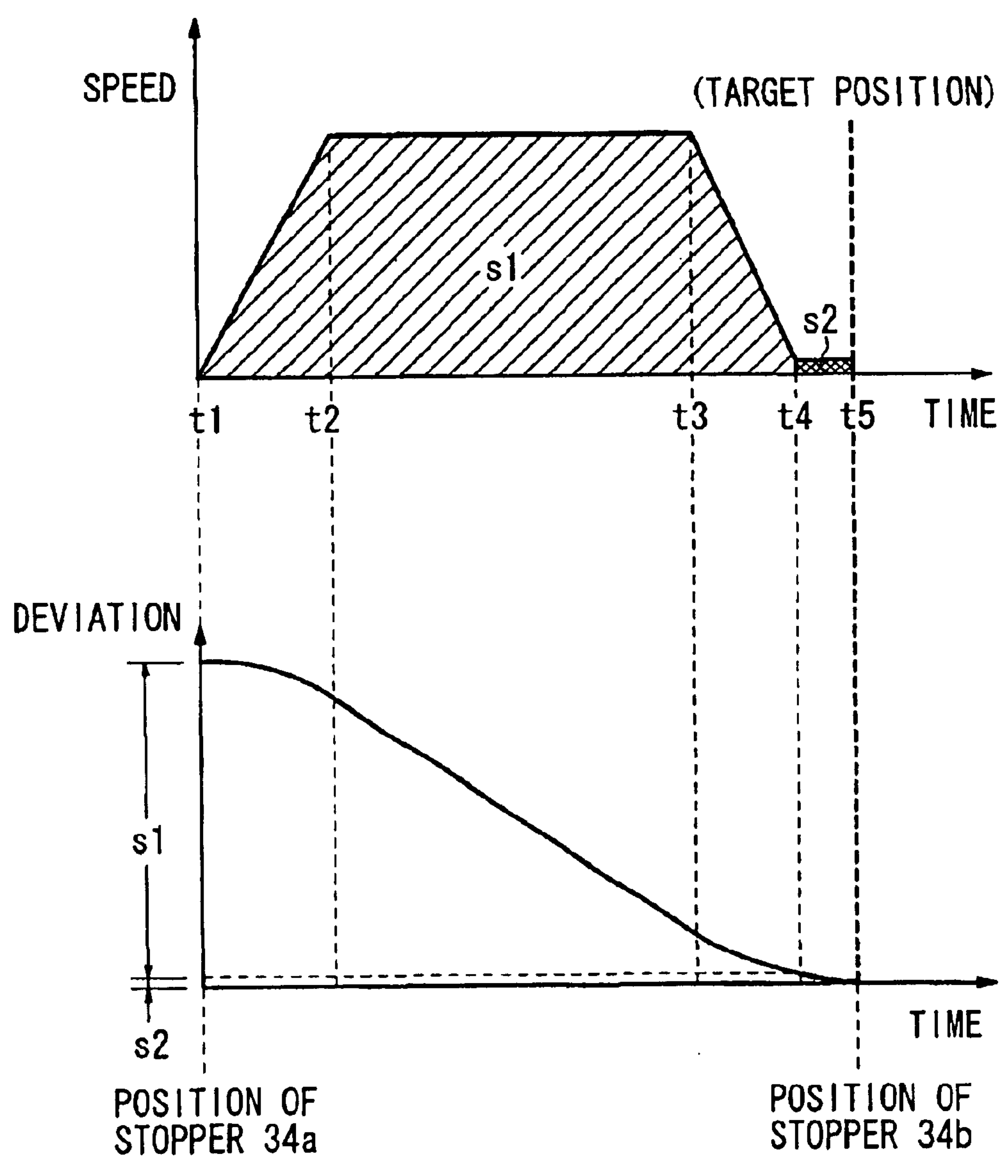
FIG. 8 is a graph illustrative of the manner in which the slider moves in the operation mode of the electric actuator.

As shown in FIG. 8, according to commands from the microcomputer 60 of the control console 36, the slider 22 is accelerated at a constant acceleration preset in step S3 (see FIG. 5) or a constant acceleration set by the microcomputer 60 or the PLC 7 between time points t1 and t2, and then moved at a constant speed preset in step S3 or a constant speed set by the microcomputer 60 or the PLC 7 between time points t2 and t3. Then, according to a command from the microcomputer 60, the slider 22 is decelerated at a constant deceleration preset in step S3 or a constant deceleration set by the microcomputer 60 or the PLC 7 between time points t3 and t4. In this manner, the slider 22 is moved a distance up to a position in front of the position of the stopper 34*b* which serves as a target position from the position of the stopper 34*a*, i.e., a distance represented by a deviation s1, based on the distance learned in step S2.

At time point t4, the slider 22 starts moving at a constant speed lower than the constant speed between time points t2 and t3. After having traveled a distance represented by a deviation s2, the slider 22 stops by abutment against the stopper 34*b*. If the microcomputer 60 judges that the slider 22 reaches the stopper 34*b*, i.e., time point t5 corresponding to the target position is reached, or stated otherwise, if the microcomputer 60 judges that the slider 22 has traveled the distance learned in step S2 based on the positional information from the encoder 38, then the microcomputer 60 stops applying the drive signal to the motor 26. At the same time, the microcomputer 60 issues a positioning completion signal through the input/output unit 62 to the PLC 7 and energizes the positioning completion indicator 92 of the indicator unit 70.

For stopping the slider 22 at the intermediate point, the user sets a control program for stopping the slider 22 between the stoppers 34*a*, 34*b* in the PLC 7. According to a command from the control program thus set, the microcomputer 60 issues a drive signal through the drive circuit 66 to the motor 26, energizing and de-energizing the motor 26 to move the slider 22 to and stop the slider 22 at the intermediate point, which has been stored in the memory unit 72 in step S11 (see FIG. 6). The slider 22 is thus moved to and stopped at the intermediate point between the stoppers 34*a*, 34*b*.

While the slider 22 is moved from the stopper 34*a* to the stopper 34*b*, i.e., in the direction indicated by the arrow X (FIG. 1) in the above example, the operation mode of the electric actuator 20 is also applicable to moving the slider 22 from the stopper 34*b* to the stopper 34*a*, i.e., in the direction indicated by the arrow Y (FIG. 1).

A protective control process (e.g., an excessive torque prevention control process) for the motor 26 controlled by the control console 36 after abutment of the slider 22 against the stopper 34*a* or the stopper 34*b* will be described below with reference to FIG. 9.

In step S20, the microcomputer 60 determines whether the slider 22 has reached the target position at time point t5 or not. If the slider 22 has reached the target position (YES in step S20), then control goes to step S21. If the slider 22 has not reached the target position (NO in step S20), then the microcomputer 60 determines whether or not the speed of the slider 22 is equal to or lower than a predetermined speed in step S22. If the speed of the slider 22 is equal to or lower than the predetermined speed (YES in step S22), then control goes to step S21. If the speed of the slider 22 is not equal to or lower than the predetermined speed (NO in step S22), then the protective control process is repeated.

In step S21, the microcomputer 60 issues a command to the drive circuit 66 to limit the drive signal applied to the motor 26. Specifically, the motor 26 may be continuously energized even after the slider 22 actually abuts against the stopper 34*a* or the stopper 34*b*, or the actual distance that the slider 22 travels may be made smaller than the desired distance by dust particles deposited around the guide rail 52. To prevent the motor 26 to generate an excessive torque in such a situation, the microcomputer 60 monitors the positional information of the slider 22 with respect to the target position (time point t5) in step S20 and the speed information of the slider 22 with respect to the predetermined speed, and controls the drive circuit 66 to limit the drive signal applied to the motor 26 to a predetermined level or lower. In this manner, the motor 26, the timing belt 30, and the stoppers 34*a*, 34*b* are prevented from being subjected to an excessive load.

A protecting control process to be performed when the timing belt 30 is flexed or subjected to an excessive tension will be described below.

If the motor 26 is continuously energized even after the slider 22 actually abuts against the stopper 34*a* or the stopper 34*b*, the timing belt 30 is flexed or excessively tensioned. As a result, the tension applied to the timing belt 30 is increased. If the applied tension becomes larger than the drive power of the motor 26, then since the tension acts in a direction opposite to the direction in which the motor 26 is normally rotated, the motor 26 is caused to rotate in the reverse direction. Once the motor 26 is reversed, the tension applied to the motor 26 then becomes smaller than the drive power of the motor 26, allowing the motor 26 to rotate again in the normal direction.

Because of the drive power of the motor 26 and the tension applied to the timing belt 30, the motor 26 is caused to rotate repeatedly alternately in the normal and reverse directions. Therefore, the timing belt 30 is vibrated, and tends to shift the stop position for the slider 22.

To avoid the above drawback, the microcomputer 60 monitors the distance that the slider 22 has traveled based on the positional information from the encoder 38, and limits the energization of the motor 26 based on whether a deviation between the drive signal applied from the microcomputer 60 to the motor 26 and the monitored distance that the slider 22 has traveled exceeds a predetermined range or not.

Figure 9:
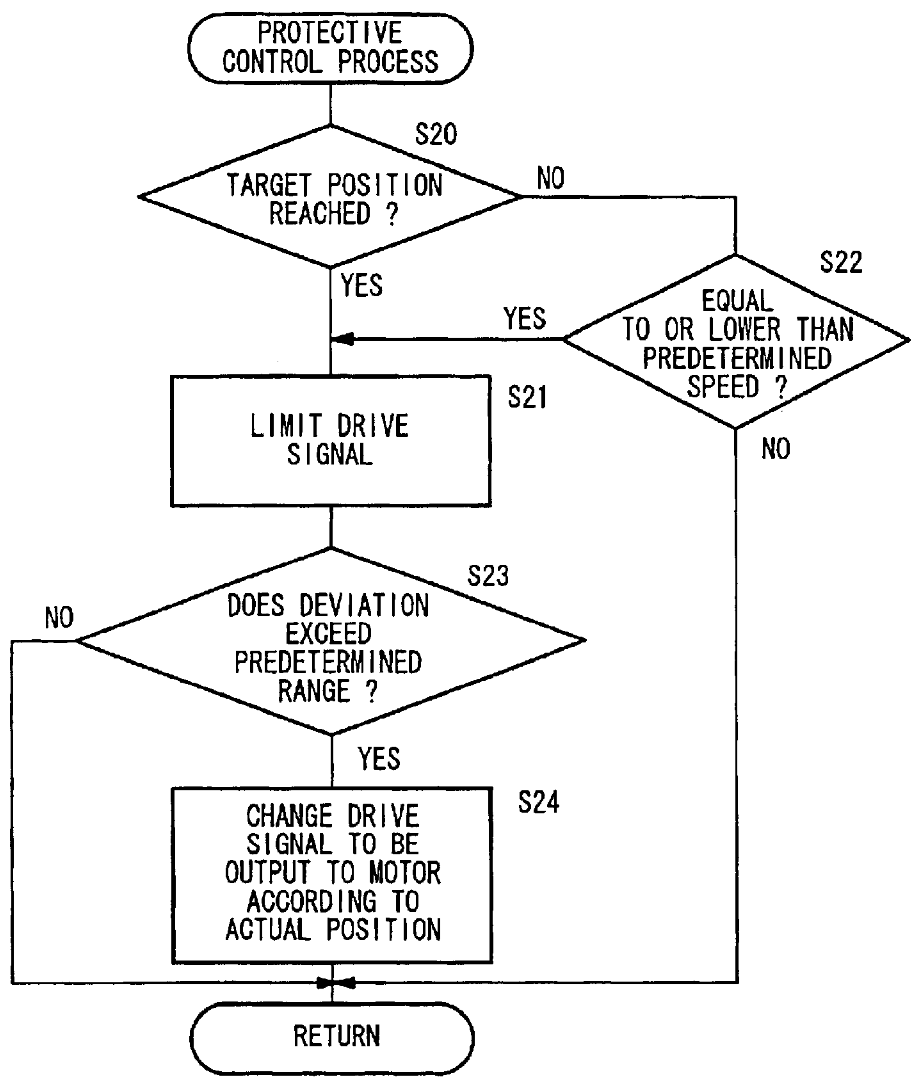
FIG. 9 is a flowchart of a protective control process of the electric actuator.

Specifically, in step S23 shown in FIG. 9, the microcomputer 60 determines whether the deviation exceeds the predetermined range or not. If the microcomputer 60 judges that the deviation exceeds the predetermined range after the slider 22 has reached the target position (YES in step S23), then the process goes to step S24.

In step S24, the microcomputer 60 resets the deviation at the target position, i.e., the position where the slider 22 is abutting against the stopper 34*a* or the stopper 34*b*, and resets the drive signal to be output to the motor 26 depending on the distance that the slider 22 has traveled which has been calculated based on the positional information from the encoder 38. The predetermined range referred to above is set to such a value that the movement and stoppage of the slider 22 will not be affected by the reversing of the motor 26 or the vibrations of the timing belt 30.

If the microcomputer 60 judges that the deviation falls within the predetermined range (NO in step S23), then since the movement and stoppage of the slider 22 is regarded as being not be affected by the motor 26 or the timing belt 30, the microcomputer 60 gives hysteresis to the deviation within the predetermined range, and does not energize the motor 26 after the slider 22 has been brought into abutment against the stopper 34*a* or the stopper 34*b*.

An example in which the motor 26 comprises a stepping motor will be described below.

Based on the excitation of excitation phases of the stepping motor, the rotor of the stepping motor rotates through step angles depending on the positions of the excitation phases and stops. Specifically, a logic circuit for exciting the excitation phases rotates the rotor of the stepping motor, rotates through the step angles and stops the rotor. The step angles correspond to the rotational angle of the motor 26. If a general 200-phase stepping motor is operated in a 1–2 phase excitation mode, then each step angle is 0.9°, and the rotor makes one revolution when it rotates through 400 step angles in one direction.

With the stepping motor, the predetermined range for the deviation between the distance that the slider 22 has traveled which has been calculated based on the positional information from the encoder 38 and the drive signal should preferably be ±1 step angle. If the deviation exceeds the range of ±1 step angle, then when the motor 26 is continuously energized even after the slider 22 actually abuts against the stopper 34*a* or the stopper 34*b*, the motor 26 may possibly be reversed and the timing belt 30 may possibly be vibrated. With the range for the deviation being thus set, the accuracy with which the slider 22 is positioned at the stopper 34*a* or the stopper 34*b* is increased, and the motor 26, the timing belt 30, and the stoppers 34*a*, 34*b* are prevented from being subjected to an excessive load.

A process of synchronizing the positional information from the encoder 38 which is an initial setting of the electric actuator 20 and the positional information corresponding to the rotational angle of the motor 26 will be described below with reference to FIG. 10. The synchronizing process is carried out because when the power supply of the electric actuator 20 is not turned on, the position of the slider 22 based on the positional information from the encoder 38 and the position of the slider 22 based on the rotational angle of the motor 26 may possibly be not associated with each other. It is assumed that the motor 26 comprises a 200-phase stepping motor and operates in a 1–2 phase excitation mode.

Figure 10:
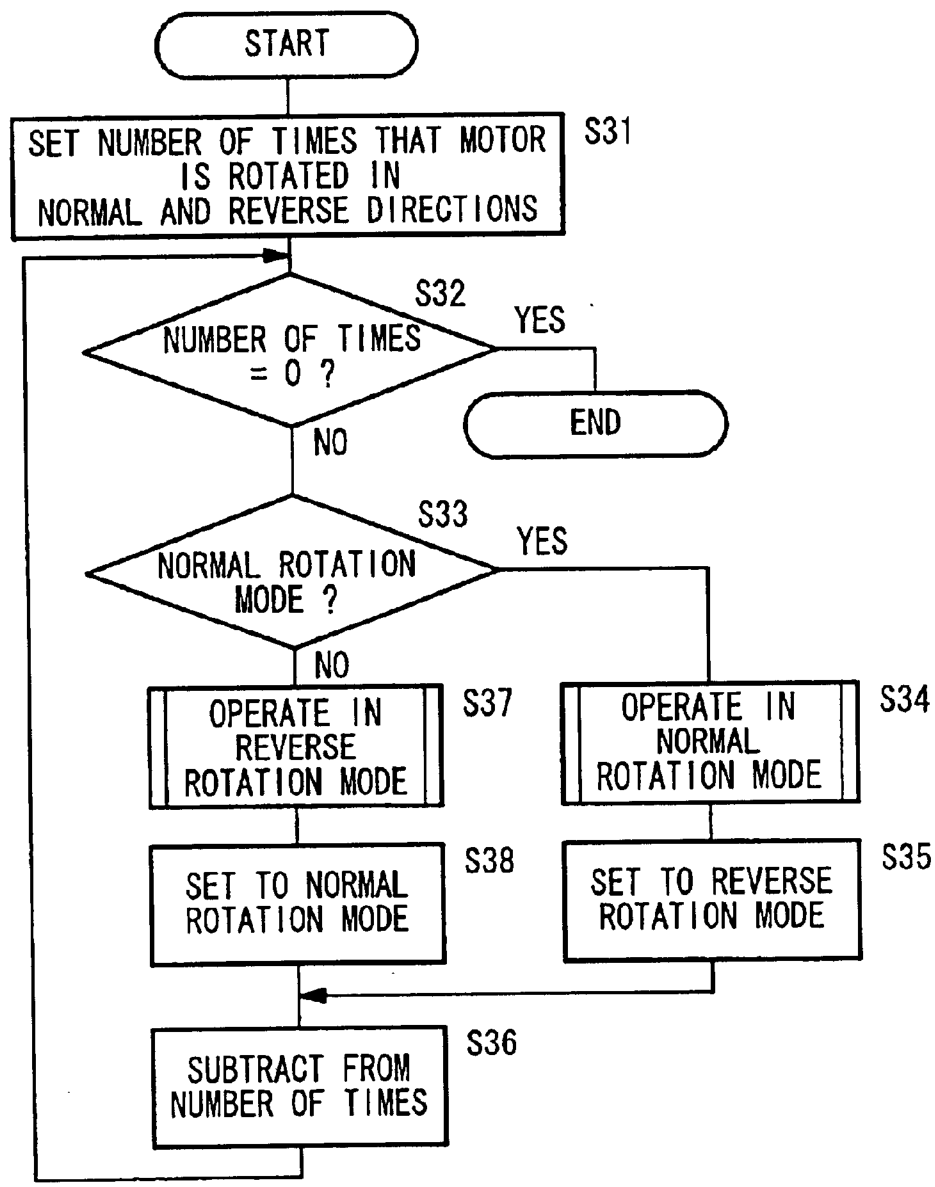
FIG. 10 is a flowchart of an initial setting process of the electric actuator.

In step S31 shown in FIG. 10, the user operates the PLC 7 to set the number of times that the motor 26 is rotated in the normal and reverse directions in a timer (not shown) in the microcomputer 60. The number of times that the motor 26 is rotated in the normal and reverse directions should preferably be in the range from 4 to 8. The number of step angles of the motor 26 when it is rotated in the normal and reverse directions is about 10.

In step S32, the microcomputer 60 determines whether the number of times that the motor 26 is rotated in the normal and reverse directions is zero or not. If the number of times that the motor 26 is rotated in the normal and reverse directions is not zero (NO in step S32), then the microcomputer 60 determines whether the motor 26 is in a normal rotation mode or not in step S33. If the motor 26 is in a normal rotation mode (YES in step S33), then the microcomputer 60 rotates the motor 26 in the normal direction (e.g., the direction indicated by the arrow X in FIG. 1) based on the given number of step angles in step S34. The slider 22 is placed between the stoppers 34*a*, 34*b*, and the motor 26 is controlled in an open loop.

When the normal rotation mode of the motor 26 is completed in step S34, the motor 26 is set to a reverse rotation mode in step S35. In step S36, the microcomputer 60 subtracts from the number of times that the motor 26 is rotated in the normal and reverse directions. Then, the process goes back to step S32.

In step S32, the microcomputer 60 determines again whether the number of times that the motor 26 is rotated in the normal and reverse directions is zero or not. It is assumed for illustrative purpose that the number of times that the motor 26 is rotated in the normal and reverse directions is not zero (NO in step S32). The microcomputer 60 then determines whether the motor 26 is in the normal rotation mode or not in step S33. Since the motor 26 has been set to the reverse rotation mode in step S35, then the answer to step S33 is NO.

In step S37, the microcomputer 60 rotates the motor 26 in the reverse direction (e.g., the direction indicated by the arrow Y in FIG. 1) based on the given number of step angles. As with the normal rotation mode, the slider 22 is placed between the stoppers 34*a*, 34*b*, and the motor 26 is controlled in an open loop.

When the reverse rotation mode of the motor 26 is completed in step S37, the motor 26 is set to the normal rotation mode in step S38. In step S36, the microcomputer 60 subtracts from the number of times that the motor 26 is rotated in the normal and reverse directions. Then, control goes back to step S32.

If the number of times that the motor 26 is rotated in the normal and reverse directions is zero (YES in step S32), i.e., if the microcomputer 60 subtracts from the number of times that the motor 26 is rotated in the normal and reverse directions in step S36 and the number of times that the motor 26 is rotated in the normal and reverse directions, which has been set in the timer, becomes zero, then the synchronizing process is put to an end.

In this manner, the motor 26 is rotated repeatedly alternately in the normal direction and the reverse direction based on the given number of step angles until the number of times that the motor 26 is rotated in the normal and reverse directions, which has been set in the timer, becomes zero. During this time, the microcomputer 60 synchronizes the positional information (the number of output pulses) from the encoder 38 and the step angles. The step angles provided by the excitation phases of the motor 26 and the positional information from the encoder 38 can now be synchronized with high accuracy. As a result, the position to which the slider 22 has been moved can accurately be detected based on the positional information depending on the step angle of the motor 26, maximizing the capability of the motor 26. At the same time, the microcomputer 60 confirms the connection between the motor 26 and the encoder 38.

In the above first embodiment, the electric actuator 20 has the slider 22 as the moving mechanism. Electric actuators according to other embodiments which have other moving mechanisms will be described below. Those parts of the electric actuators according to the other embodiments which are identical to those of the electric actuator 20 according to the first embodiment are denoted by identical reference characters and will not be described in detail below.

Figure 11:
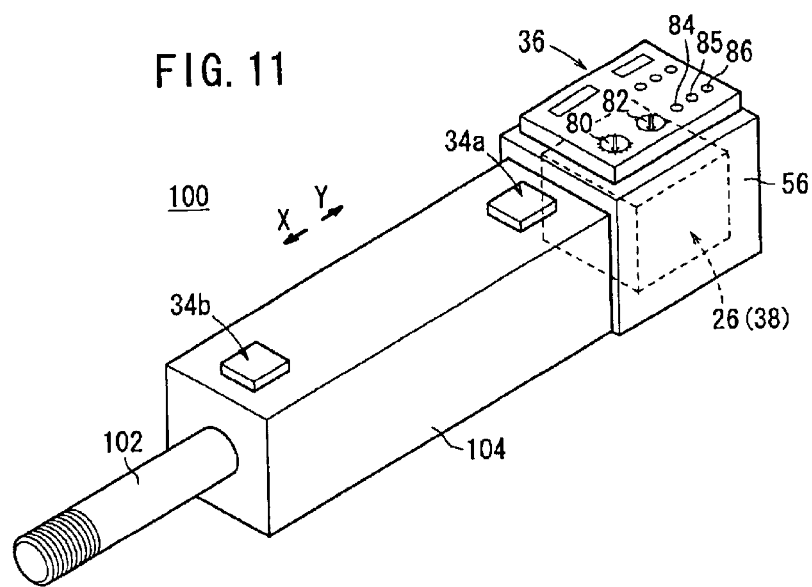
FIG. 11 is a perspective view of an electric actuator according to a second embodiment of the present invention.

FIG. 11 shows an electric actuator 100 according to a second embodiment of the present invention.

As shown in FIG. 11, a rod 102 serving as a moving mechanism is slidably supported by a guide mechanism 104. An abutment member (not shown) is fixed to the rod 102 within the guide mechanism 104. The abutment member is placed between the stoppers 34*a*, 34*b* that extend in the guide mechanism 104.

The rotor 102 is axially moved by the motor 26 and is positioned when the abutment member abuts against the stopper 34*a* and the stopper 34*b*.

Figure 12:
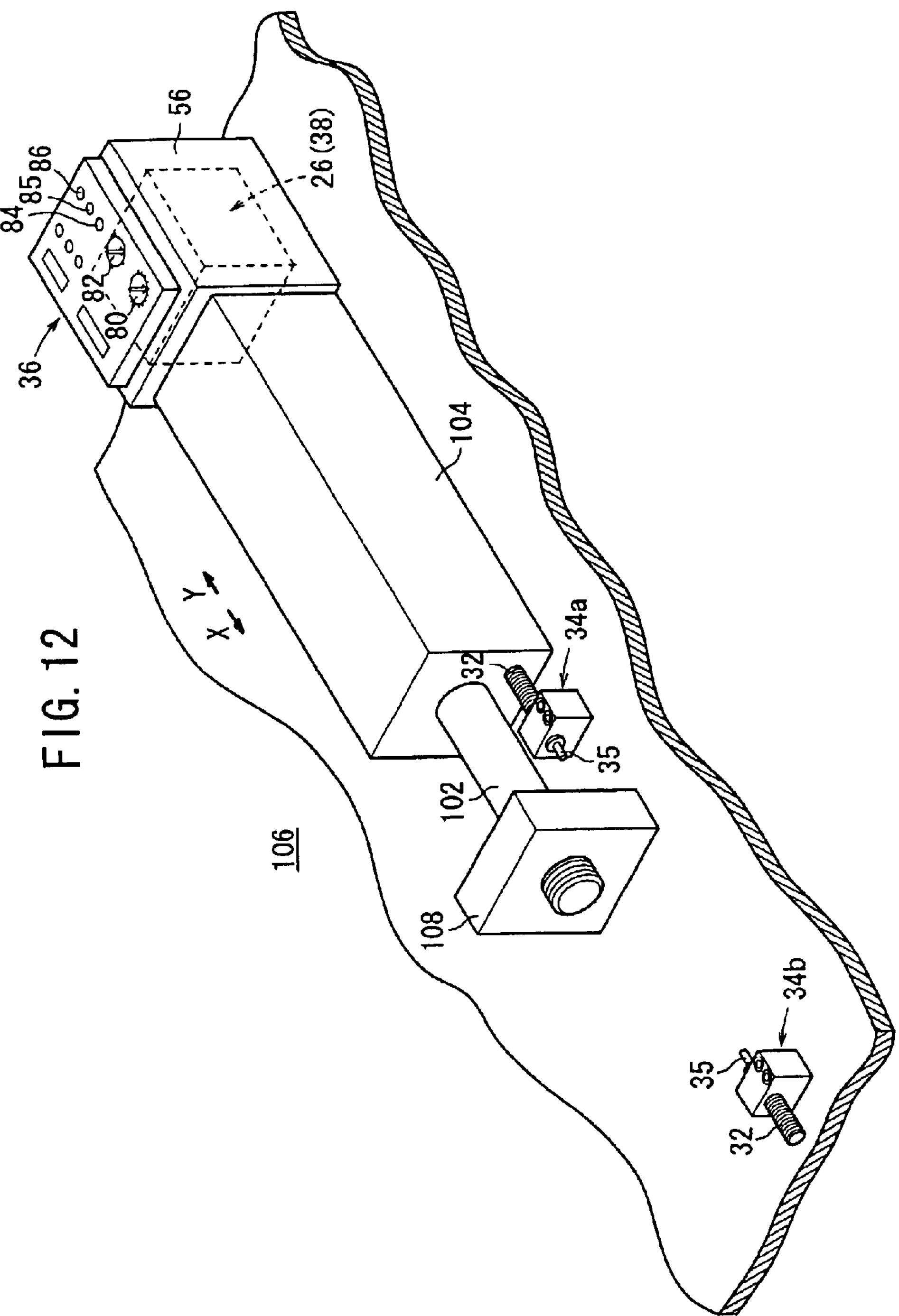
FIG. 12 is a perspective view of an electric actuator according to a third embodiment of the present invention.

FIG. 12 shows an electric actuator 106 according to a third embodiment of the present invention.

As shown in FIG. 12, the electric actuator 106 is similar to the electric actuator 100 shown in FIG. 11 except that the stoppers 34*a*, 34*b* including the stop bolts 32 and the abutment member 108 fixed to the rod 102 are disposed outside of the guide mechanism 104.

Figure 13:
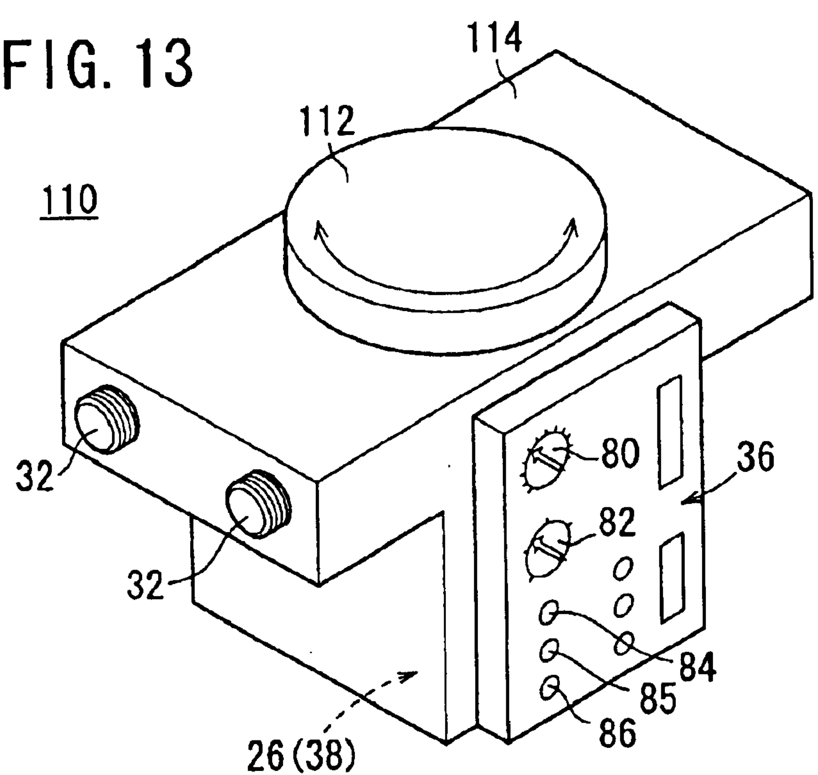
FIG. 13 is a perspective view of an electric actuator according to a fourth embodiment of the present invention.

FIG. 13 shows an electric actuator 110 according to a fourth embodiment of the present invention.

Figure 14:
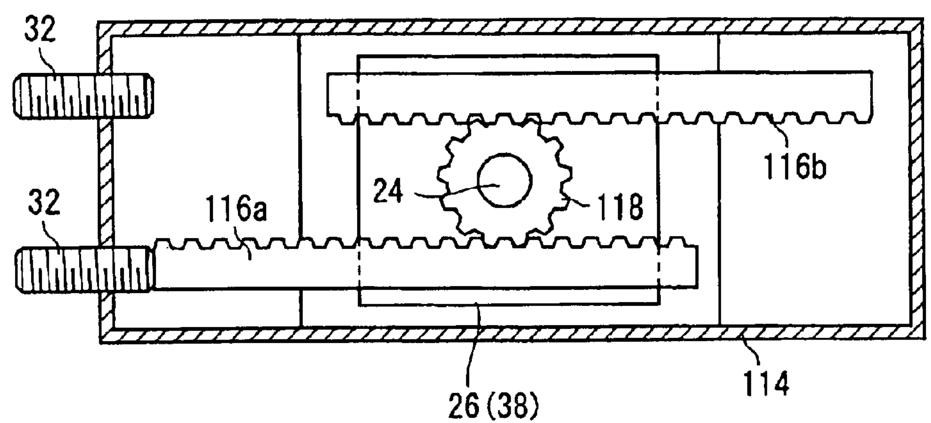
FIG. 14 is a cross-sectional view of the electric actuator shown in FIG. 13.
Figure 15:
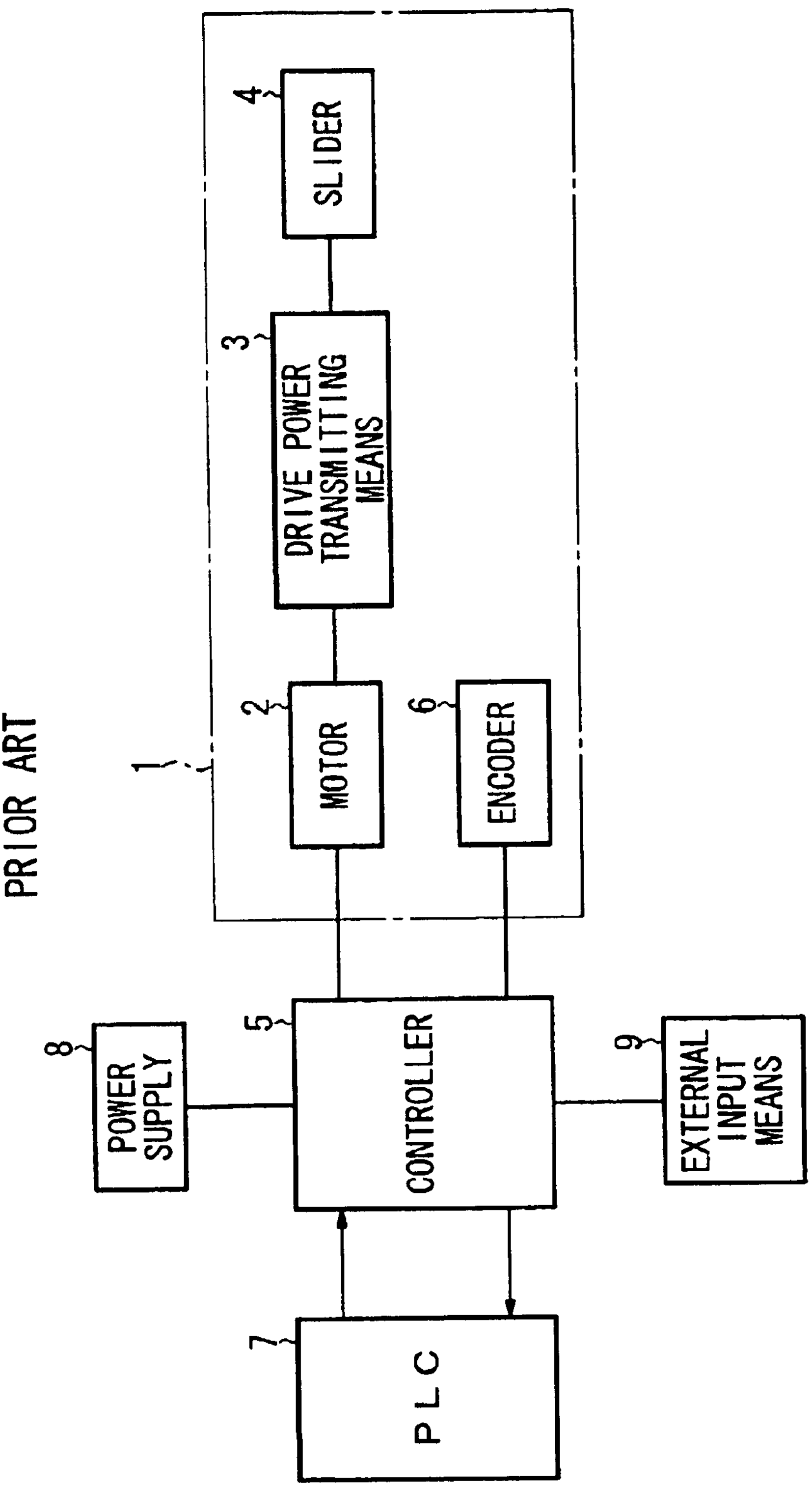
FIG. 15 is block diagram of a control system including a conventional electric actuator, a power supply, and a PLC.
Figure 16:
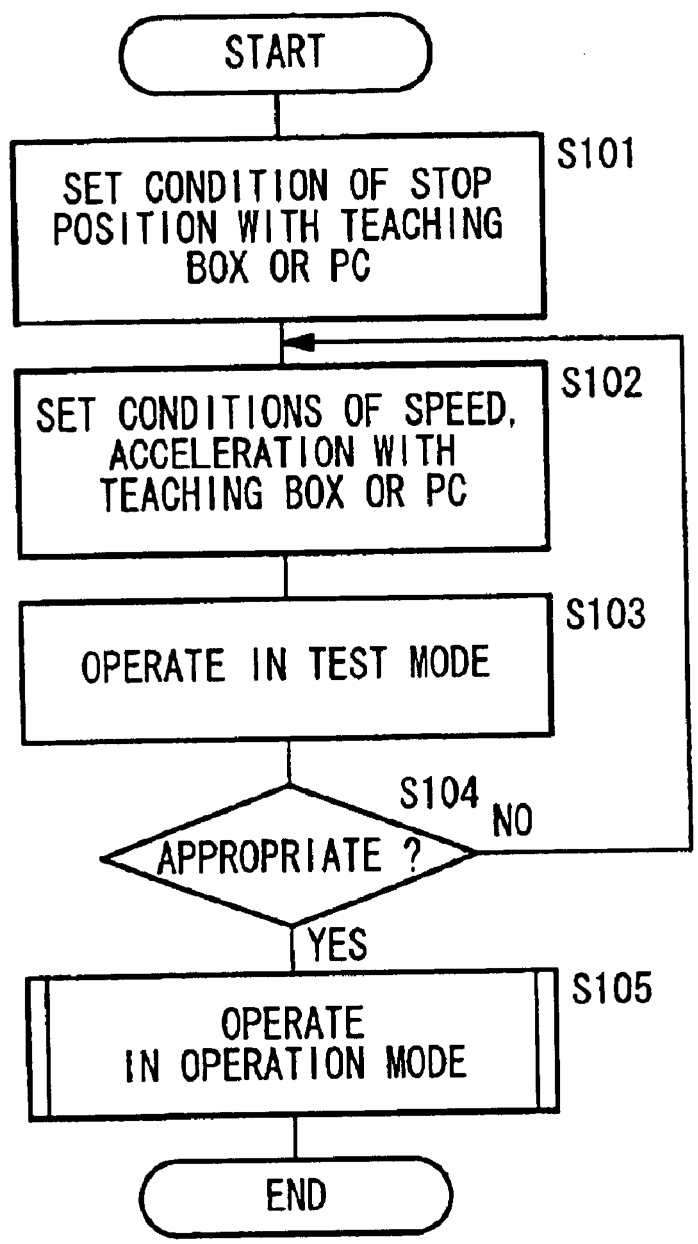
FIG. 16 is a flowchart of a process of setting moving conditions for the conventional electric actuator shown in FIG. 15 and changing from a test mode to an operation mode.

As shown in FIG. 13, a turntable 112 serving as a moving mechanism is mounted on the upper end of the drive shaft 24 of the motor 26 which is disposed in a casing 114. The casing 114 houses parallel slide gears 116*a*, 116*b* (see FIG. 14) slidably supported therein and the slide gears 116*a*, 116*b* are facing each other. The slide gears 116*a*, 116*b* are held in mesh with a gear 118 fitted over the drive shaft 24 of the motor 26, and can be slid in their longitudinal direction by the motor 26. Stop bolts 32 are threaded through a side wall of the casing 114 in alignment with the respective slide gears 116*a*, 116*b* for abutment against respective ends of the slide gears 116*a*, 116*b*. The stop bolts 32 can be turned about their axes to adjust their positions in which they abut against the slide gears 116*a*, 116*b*.

When the turntable 112 is rotated by the motor 26, the gear 118 rotates to move the slide gears 116*a*, 116*b* axially until one of the slide gears 116*a*, 116*b* abuts against the corresponding stop bolt 32, whereupon the turntable 112 is angularly positioned.

With the electric actuator 20 and the method of controlling the electric actuator 20 according to the present invention, a stop position as a moving condition for the slider 22 is set by positional adjustment of the stoppers 34*a*, 34*b*, and a speed and an acceleration as other moving conditions for the slider 22 are set by the speed regulator 80 and the acceleration regulator 82 which are operated by the user while confirming the movement of the slider 22. Therefore, the user of the electric actuator 20 is not required to perform a complex process of entering numerical data representing moving conditions from the external input mechanism 9, and can easily and reliably set moving conditions for the slider 22.

The distance that the slider 22 is moved is learned, and the slider 22 is moved at a speed in the constant-speed movement and an acceleration in the accelerated movement which are changed based on the learned distance. When the slider 22 is to abut against the stopper 34*a* or the stopper 34*b*, the slider 22 is controlled to move at a speed lower than the speed in the constant-speed movement and then be positioned in abutment against the stopper 34*a* or the stopper 34*b*. As a result, the slider 22 can accurately be positioned by the stopper 34*a* or the stopper 34*b*.

Since the positioning accuracy of the slider 22 is determined by abutment of the slider 22 against the stopper 34*a* or the stopper 34*b*, the slider 22 can be positioned accurately by the encoder 38 and the timing belt 30 which are less expensive than a positional information detector having a higher resolution than the encoder 38, such as a different encoder of higher resolution, and a drive power transmitting mechanism such as a ball screw or the like. As the stoppers 34*a*, 34*b* have the shock absorbers 35, shocks that are produced when the slider 22 abuts against the stopper 34*a* or the stopper 34*b* are dampened.

At least one of the stop position, the speed in the constant-speed movement, and the acceleration in the accelerated movement for the slider 22 is set by the external manipulation unit 98. Consequently, the user can remotely set the moving conditions for the slider 22.

The microcomputer 60 of the control console 36 monitors the distance that the slider 22 has traveled which has been calculated based on the positional information from the encoder 38, and the speed of the slider 22. After the slider 22 abuts against the stopper 34*a* or the stopper 34*b*, if the microcomputer 60 judges that the monitored distance reaches the distance learned by the microcomputer 60, i.e., if the slider 22 reaches the position of the stopper 34*a* or the stopper 34*b*, or if the microcomputer 60 judges that the monitored distance does not reach the distance learned by the microcomputer 60 and the speed of the slider 22 is equal to or lower than a predetermined speed, then the drive circuit 66 limits the drive signal output to the motor 26 based on a command from the microcomputer 60. Therefore, after the slider 22 abuts against the stopper 34*a* or the stopper 34*b*, the motor 26 is prevented from generating an excessive torque, and hence the motor 26, the timing belt 30, and the stoppers 34*a*, 34*b* are prevented from being subjected to an excessive load. Accordingly, the durability of the electric actuator 20 is increased.

The microcomputer 60 monitors the distance that the slider 22 has traveled which has been calculated based on the positional information from the encoder 38, and the distance that the slider 22 has traveled which is based on the rotational angle of the motor 26. After the slider 22 abuts against the stopper 34*a* or the stopper 34*b*, if the deviation between the calculated distance and the distance based on the rotational angle of the motor 26 exceeds a predetermined range, then the microcomputer 60 resets the deviation. Therefore, the positioning accuracy of the slider 22 in the stop positions at the stoppers 34*a*, 34*b* is increased, and the stoppers 34*a*, 34*b* are prevented from being subjected to an excessive load. Accordingly, the durability of the electric actuator 20 is further increased.

When the power supply of the electric actuator 20 is turned on, the microcomputer 60 rotates the motor 26 alternately in the normal and reverse directions under open-loop control, and synchronizes the positional information from the encoder 38 and the positional information based on the rotational angle of the motor 26 with each other. Consequently, the position to which the slider 22 is moved can accurately be detected according to the positional information based on the rotational angle of the motor 26, maximizing the capability of the motor 26.

Technical concepts, which can be conjectured from the embodiments of the present invention, other than those described in claims, together with their operation and advantages, will be described below.

An electric actuator having a moving mechanism movable by drive power from an electric drive source includes at least one of a speed regulator for setting a speed in constant-speed movement of the moving mechanism and an acceleration regulator for setting an acceleration in accelerated movement of the moving mechanism, a normal rotation manipulation element and a reverse rotation manipulation element for operating the electric drive source to move the moving mechanism as desired, and graduations for specifying and confirming settings on the speed regulator and the acceleration regulator.

The electric actuator includes the speed regulator, the acceleration regulator, the normal rotation manipulation element, and the reverse rotation manipulation element for providing functions corresponding to a restriction valve (speed control valve) for regulating the speed, a cushion needle for regulating the acceleration at a stroke end of an air cylinder and dampening shocks, and a directional control valve for confirming operation of the air cylinder as if the air cylinder were used as a drive source for the moving mechanism. The electric actuator provides easy handling like the air cylinder, and attempts to dampen shocks that are applied to the moving mechanism when it operates at a high speed, which would be a problem if the air cylinder were used, and to eliminate a complex process of individually setting moving conditions for a plurality of air cylinders which would otherwise be used.

The electric actuator is capable of easily adjusting at least one of the speed and the acceleration while the user is confirming a movement of the moving mechanism as if the air cylinder were used. The normal rotation manipulation element and the reverse rotation manipulation element which are used to move the moving mechanism as desired allow the user to easily confirm how the moving mechanism is operated. The graduations on the speed regulator and the acceleration regulator also allow the user to specify and confirm settings with ease.

In the technical concepts described above, each of the speed regulator and the acceleration regulator has a stepwise adjustable mechanism. If a plurality of electric actuators are used, then since their speed and acceleration regulators can be adjusted at identical stepwise graduations, the user can efficiently make settings for the electric actuators.

Although certain preferred embodiments of the present invention have been shown and described in detail, it should be understood that various changes and modifications may be made therein without departing from the scope of the appended claims.

What is claimed is:

1. An electric actuator having a moving mechanism movable by drive power from an electric drive source, comprising:

at least one positioning mechanism for adjusting relative stop positions of a start point and an end point for the moving mechanism;

a positional information detector for detecting positional information of said moving mechanism between said start point and said end point;

at least one of a speed regulator for setting a speed in constant-speed movement of said moving mechanism and an acceleration regulator for setting an acceleration in accelerated movement of said moving mechanism;

a control console having a learning device for learning a distance that said moving mechanism travels between said start point and said end point; and a learning manipulation element for operating said learning device;

wherein a stop position for said moving mechanism is set by positionally adjusting said positioning mechanism, said learning device learns the distance that said moving mechanism travels according to a command from said control console in response to a manipulation of said learning manipulation element, and at least one of the speed in constant-speed movement of said moving mechanism and the acceleration in accelerated movement of said moving mechanism is set by manipulation of said speed regulator or said acceleration regulator;

wherein said control console outputs a drive signal to said electric drive source to move said moving mechanism based on the positional information from said positional information detector, at least one of the speed set by said speed regulator and the acceleration set by said acceleration regulator, and the distance that said moving mechanism travels which is learned by said learning device and when said moving mechanism is to reach said start point or said end point, said control console controls said moving mechanism to move at a speed lower than said speed in constant-speed movement and be positioned at said start point or said end point.

2. An electric actuator according to claim 1, wherein said electric drive source comprises a stepping motor or one of a DC motor, an AC motor, and a linear motor.

3. An electric actuator according to claim 1, wherein said positioning mechanism includes a shock absorber for damping shocks produced when said moving mechanism abuts against said positioning mechanism.

4. An electric actuator according to claim 1, wherein said moving mechanism comprises a turntable rotatably mounted on said electric drive source.

5. An electric actuator according to claim 1, wherein said positioning mechanism is a rod slidably supported by a guide mechanism.

6. An electric actuator according to claim 5, wherein said positioning mechanism is disposed outside of said guide mechanism.

7. A method of controlling an electric actuator having a moving mechanism movable by drive power from an electric drive source through a drive power transmitting mechanism, said electric actuator including at least one positioning mechanism for adjusting relative stop positions of a start point and an end point for the moving mechanism, a positional information detector for detecting positional information of said moving mechanism, at least one of a speed regulator for setting a speed in constant-speed movement of said moving mechanism and an acceleration regulator for setting an acceleration in accelerated movement of said moving mechanism, a control console having a learning device, for learning a distance that said moving mechanism travels between said start point and said end point, and a learning manipulation element for operating said learning device, said method comprising the steps of:

setting a stop position for said moving mechanism by positionally adjusting said positioning mechanism;

learning the distance that said moving mechanism travels with said learning device according to a command from said control console in response to a manipulation of said learning manipulation element; and setting at least one of the speed in constant-speed movement of said moving mechanism and the acceleration in accelerated movement of said moving mechanism by manipulating said speed regulator or said acceleration regulator;

wherein said control console outputs a drive signal to said electric drive source to move said moving mechanism based on the positional information from said positional information detector, at least one of the speed set by said speed regulator and the acceleration set by said acceleration regulator, and the distance that said moving mechanism travels which is learned by said learning device and when said moving mechanism is to reach said start point or said end point, said control console controls said moving mechanism to move at a speed lower than said speed in constant-speed movement and be positioned at said start point or said end point.

8. A method according to claim 7, wherein said moving mechanism is stopped at an intermediate point between said start point and said end point according to a command from said control console based on the positional information from said positional information detector.

9. A method according to claim 7, wherein said control console monitors the distance that said moving mechanism travels which is calculated based on the positional information from said positional information detector and the speed of said moving mechanism, and limits a drive signal output to said electric drive source after said moving mechanism reaches said start point or said end point if the monitored distance that said moving mechanism travels is judged as reaching the distance learned by said learning device or if the monitored distance that said moving mechanism travels is judged as not reaching the distance learned by said learning device and the speed of said moving mechanism is equal to or lower than a predetermined speed.

10. A method according to claim 7, wherein said electric drive source comprises a motor, and said control console monitors the distance that said moving mechanism travels which is calculated based on the positional information from said positional information detector, and resets a deviation between said drive signal and the monitored distance that said moving mechanism travels if said deviation exceeds a predetermined range after said moving mechanism reaches said start point or said end point.

11. A method according to claim 7, wherein said electric drive source comprises a motor, and said control console rotates said motor alternately in a normal direction and a reverse direction under open-loop control to synchronize the positional information from said positional information detector and positional information corresponding to a rotational angle of said motor with each other when a power supply of said electric actuator is turned on.

* * * * *